United States Patent
Bouwhuis et al.

[11] 3,969,573
[45] July 13, 1976

[54] APPARATUS FOR READING A RECORD CARRIER ON WHICH INFORMATION IS STORED IN AN OPTICALLY READABLE STRUCTURE

[75] Inventors: Gijsbertus Bouwhuis; Carel Arthur Jan Simons, both of Eindhoven, Netherlands

[73] Assignee: U.S. Philips Corporation, New York, N.Y.

[22] Filed: Apr. 29, 1974

[21] Appl. No.: 464,789

[30] Foreign Application Priority Data
Feb. 15, 1974 Netherlands .................. 7402170

[52] U.S. Cl. .................. 178/6.6 R; 179/100.3 V; 178/6.7 A; 350/157
[51] Int. Cl.² .................. G11B 7/00; G02F 1/01
[58] Field of Search .................. 178/6.7 A, 6.6 R; 179/100.3 V; 350/157

[56] References Cited
UNITED STATES PATENTS
3,829,622  8/1974  Elliot .................. 179/100.3 V OTHER PUBLICATIONS
"The Optical Scanning System of the Philips 'VLP' Record Player," by Bouwhuis and Burgstede; Philips Tech. Rev. 33, pp. 186–189, 1973, No. 7.

*Primary Examiner*—Bernard Konick
*Assistant Examiner*—Alan Faber
*Attorney, Agent, or Firm*—Frank R. Trifari; Simon L. Cohen

[57] ABSTRACT

An apparatus is described for reading a record carrier on which information is stored in an optically readable structure. Between a radiation source and an objective system, a polarization-sensitive beam splitter and a λ/4 plate are disposed. The optic axis of the λ/4 plate is perpendicular to the end faces, so that the plate may be thick and may be rotated in its own plane.

1 Claim, 1 Drawing Figure

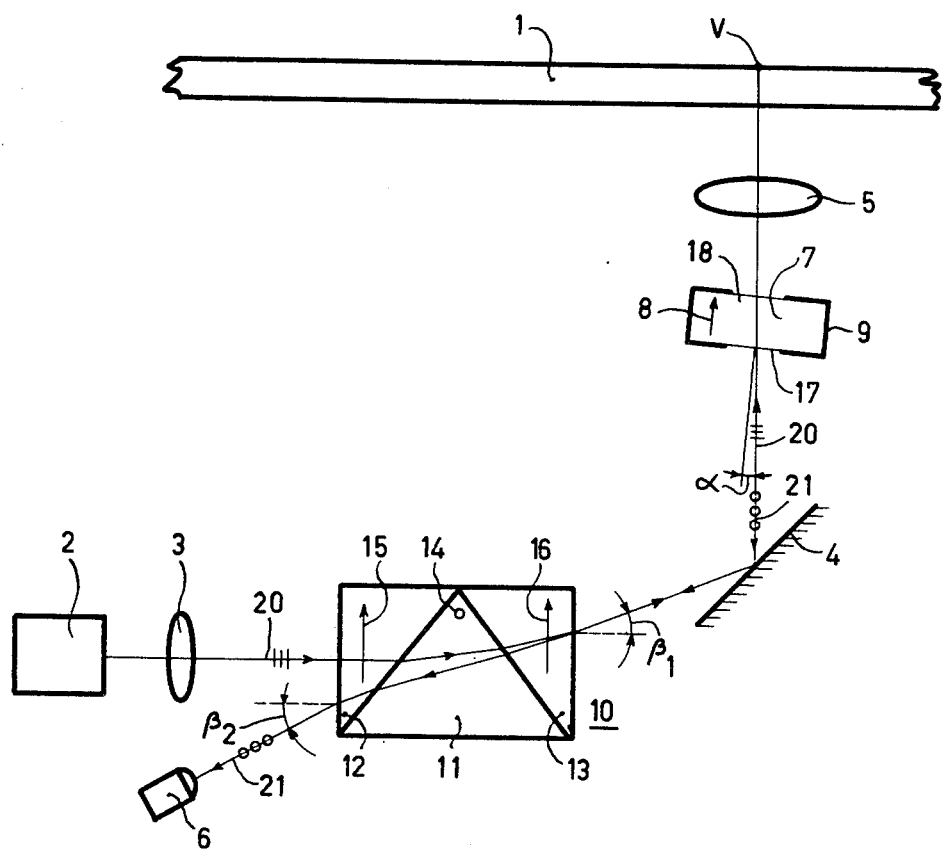

APPARATUS FOR READING A RECORD CARRIER ON WHICH INFORMATION IS STORED IN AN OPTICALLY READABLE STRUCTURE

The invention relates to an apparatus for reading a record carrier on which information is stored in an optically readable reflecting structure, which apparatus includes a radiation source which supplies a read beam, an objective system for focussing the read beam to a read spot on the information structure of the record carrier, and a radiation-sensitive detector for converting the read beam which is reflected and modulated by the information structure into an electrical signal, the radiation path between the radiation source and the objective system and between said objective system and the detector including a polarization-sensitive beam-splitter and a λ/4 plate, for separating the unmodulated and the modulated read beam.

Such an apparatus is known, inter alia from: "Philips' Technical Review" 33, No. 7, pages 186–189. In the known read apparatus the radiation source supplies a linearly polarized read beam. On its way to the objective system said beam traverses a polarization-sensitive beam splitting mirror and a λ/4 plate disposed in a diagonal position. The mirror only transmits radiation of a specific first direction of polarization and reflects radiation of a second direction of polarization which is perpendicular to the first direction of polarization. The λ/4 plate is traversed twice, once by the unmodulated read beam and once by the modulated read beam. As a result, the plane of polarization is rotated through 90° in total, so that the polarization-sensitive mirror reflects the modulated read beam out of the radiation path of the unmodulated read beam and to a detector. Thus, an effective separation is obtained, so that both the radiation power is employed efficiently, and undesired feedback to the radiation source is prevented. Avoiding feedback to the radiation source is of importance if said source is a gas laser.

As λ/4 plate the read apparatus until now employed a plate whose end faces (or the entrance and exit faces) were cut parallel to the optic axis. A radiation beam which is incident perpendicularly to the entrance plane is subject to a maximum doubly-refracting effect. Materials having a low refractive index which are inexpensive and conveniently workable or not known, so that to obtain the desired rotation of the plane of polarization, the known λ/4 plate must be very thin (for example 16 $\mu$). Such a thin plate, however, is inconvenient to handle. A plate which has a thickness of $(2n + 1) \lambda/4$ is very sensitive to tilting. Furthermore, the operation of the known λ/4 plate is greatly affected by small deviations of the thickness of the plate, so that very stringent requirements must be imposed on the thickness-accuracy of the plate. For this reason the known λ/4 plate is less suitable to be used in a read apparatus which is intended as a mass-product.

The present invention provides a λ/4 plate, destined for read apparatus, which may readily be mass-produced. A read apparatus according to the invention is characterized in that the λ/4 plate is disposed in a holder in such a way that the normal to the entrance and exit faces for the read beam makes a small angle with said beam, and that the optic axis of the λ/4 plate is perpendicular to the entrance and exit faces, so that the operation of the λ/4 plate is independent of its position within the holder.

A small angle is to be understood to mean an angle smaller than approximately 25°. The fact that a λ/4 plate according to the invention can be rotated about an axis perpendicular to the entrance and exit faces without its operation being adversely affected, is of great advantage in the assembly of a read apparatus.

The invention will be described with reference to the drawing, which shows a read apparatus provided with a λ/4 plate according to the invention.

In the FIGURE the reference numeral 1 is a record carrier, for example, a record carrier in the form of a tape or a disc-shaped record carrier. By way of example, it is assumed that the carrier body is transparent, and that the information is stored at the top surface of the record carrier. On the information structure a radiation spot V is projected. The radiation spot is formed by a narrow read beam 20 which is emitted by the radiation source 2, for example a laser source, of which only the principal ray is shown. For this, use is made of a lens 3, a plane mirror 4 and an objective lens 5. The lens 3 is used for filling the entire pupil of the objective lens. The information structure is a reflecting structure, so that the read beam, after being modulated by said structure in accordance with the stored information, returns substantially along itself. In order to separate the modulated read beam 21 from the unmodulated read beam 20, a prism system 10 and a λ/4 plate 7 are included in the radiation path.

The prism system consists of three component prisms 11, 12 and 13 and is consequently non-astigmatic. The optic axes 15 and 16 of the outer component prisms are parallel and perpendicular to the optic axis 14 of the central prism 11. The principal ray of the read beam 20 traverses the component prism 12 without being refracted. When the direction of polarization of the read beam 20 is disposed in the plane of drawing, as indicated, the principal ray traverses the component prism 11 as extraordinary ray and the component prism 13 as ordinary ray and is refracted through a certain angle by each of the prisms. In total the principal ray of the read beam is deflected by the prism system through a specific angle ($\beta_1$), depending on the refractive indices of the prism material. Subsequently, the λ/4 plate 7, which is arranged in a diagonal position, is traversed twice, so that the direction of polarization is rotated through 90°. The principal ray of the modulated read beam 21 passes the component prism 13 as the extraordinary ray, the component prism 11 as the ordinary ray, and the component prism 12 as extraordinary ray. In each of the component prisms the principal ray is refracted at a certain angle, so that the principal ray of the read beam 21 is aimed at the radiation-sensitive detector 6 at an angle $\beta_2$ relative to the principal ray of the beam 20.

The λ/4 plate must effect a rotation of the plane of polarization of 90°. The plate may consist of quartz. According to the invention the end faces 17 and 18 have been cut perpendicularly to the optic axis 8, and the plate is disposed so that the normal to the end face 17 makes a small angle α with the principal ray of the read beam 20.

In the direction of the optic axis one double refraction occurs. A ray which makes a small angle with the optic axis is subject to a small amount of double refraction. To experience sufficient double refraction said ray must traverse a thick plate. In this respect "thick" is to be understood to mean: thick compared with the known λ/4 plate, where the optic axis was parallel to the end faces. In an embodiment of a λ/4 plate according to the invention the thickness was 1.39 mm, while the angle α was approximately 10°. The angle α may not be smaller than a few degrees, if quartz is used. This is because quartz has the property to rotate the plane of polarization for a ray whose direction approximates to that of the optic axis.

An irregularity in the surface of a thick λ/4 plate according to the invention will have a substantially smaller effect on the operations of the plate than with the known, thin λ/4 plate. Indeed, in the case of a thick λ/4 plate a similar irregularity will form a small part of the desired pathlength to be transversed, and in the case of a thin λ/4 plate it will be a substantial part of the pathlength and even approximate this.

From a point of view of assembly the λ/4 plate according to the invention is also advantageous. The λ/4 plate is placed in a holder 9, which is schematically shown. Said holder only defines the direction of the entrance and exit faces 17 and 18. Upon rotation of the λ/4 plate within said holder through a certain angle, said optic axis will rotate along through the same angle if the optic axis is parallel to the end faces 17 and 18, so that the orientation of the optic axis relative to the direction of polarization of the incident radiation changes. Therefore, the known thin λ/4 plate must be oriented in a specific manner in the holder. In the case of the proposed λ/4 plate, the optic axis will retain a fixed spatial direction upon rotation of the plate in its holder. The orientation of the optic axis relative to the direction of polarization of the incident radiation will not change. The proposed λ/4 plate may therefore be inserted in the holder in an arbitrary way, without adversely affecting the separation of the read beams 20 and 21.

As stated previously, the known λ/4 plate 7 is placed "in a diagonal position", i.e. the projection of the optic axis in the plane which is determined by the directions of polarization of the beams 20 and 21, makes an angle (the azimuth angle) of 45° with said directions of polarization of the modulated and the unmodulated read beam.

Because of the rotation of the plane of polarization introduced by quartz, the azimuth angle will be smaller than 45° for the proposed λ/4 plate. In the embodiment of the λ/4 plate with a thickness of 1.39 mm and an angle α of 10° the azimuth angle was 28°.

What is claimed is:

1. An apparatus for reading a record carrier on which information is stored on an optically readable reflecting structure, which apparatus includes a radiation source which supplies a read beam, an objective system for focussing the read beam to a read spot on the information structure of the record carrier, and a radiation-sensitive detector for converting the read beam which is reflected and modulated by the information structure into an electrical signal, the radiation path between the radiation source and the objective system and between said objective system and the detector including a polarization-sensitive beam splitter and a λ/4 plate, wherein the beam splitter is positioned between the detector and the λ/4 plate, for separating the modulated and the unmodulated read beam, characterized in that the λ/4 plate is disposed in a holder in such a way that the normal to the entrance and exit faces for the read beam makes a small angle with said beam, and that the optic axis of the λ/4 plate is perpendicular to the entrance and exit faces so that the operation of the λ/4 plate is independent of its rotational position within the holder.

* * * * *